United States Patent
Sobel

(10) Patent No.: US 10,592,662 B1
(45) Date of Patent: Mar. 17, 2020

(54) SYSTEMS AND METHODS FOR ALTERING TIME DATA

(71) Applicant: CA, INC., San Jose, CA (US)

(72) Inventor: William E. Sobel, Jamul, CA (US)

(73) Assignee: CA, Inc., San Jose, CA (US)

( * ) Notice: Subject to any disclaimer, the term of this patent is extended or adjusted under 35 U.S.C. 154(b) by 183 days.

(21) Appl. No.: 15/702,781

(22) Filed: Sep. 13, 2017

(51) Int. Cl.
  *G06F 21/52* (2013.01)
  *G06F 21/56* (2013.01)
  *H04L 12/24* (2006.01)
  *G06F 21/57* (2013.01)
  *H04L 29/06* (2006.01)

(52) U.S. Cl.
  CPC ............ *G06F 21/52* (2013.01); *G06F 21/566* (2013.01); *G06F 21/577* (2013.01); *H04L 41/28* (2013.01); *H04L 63/1416* (2013.01)

(58) Field of Classification Search
  CPC ...... G06F 21/52; G06F 21/566; G06F 21/577; H04L 41/28; H04L 63/1416
  See application file for complete search history.

(56) References Cited

U.S. PATENT DOCUMENTS

| | | | | |
|---|---|---|---|---|
| 5,195,025 A * | 3/1993 | Boecker | ................... | G06F 1/14 700/16 |
| 5,826,066 A * | 10/1998 | Jardine | ..................... | G06F 1/14 713/400 |
| 7,155,741 B2 | 12/2006 | Sobel et al. | | |
| 8,462,212 B1 * | 6/2013 | Kundu | ................. | G07G 1/0081 348/150 |
| 9,177,153 B1 * | 11/2015 | Perrig | ..................... | G06F 21/57 |
| 2005/0183072 A1 * | 8/2005 | Horning | .................. | G06F 21/14 717/140 |
| 2007/0220297 A1 * | 9/2007 | Orlando | ................... | G06F 21/74 713/503 |
| 2014/0010515 A1 * | 1/2014 | Lee | ........................ | H04L 65/605 386/207 |
| 2014/0041026 A1 * | 2/2014 | Scott | ....................... | G06F 21/53 726/22 |
| 2017/0286675 A1 * | 10/2017 | Shin | ......................... | G06F 1/12 |
| 2019/0012672 A1 * | 1/2019 | Francesco | .............. | G06Q 20/34 |

OTHER PUBLICATIONS

Chromium bug report 506723 https://bugs.chromium.org/p/chromium/issues/detail?id=506723); Jul. 3, 2015.

(Continued)

*Primary Examiner* — Techane Gergiso
(74) *Attorney, Agent, or Firm* — FisherBroyles, LLP

(57) ABSTRACT

The disclosed computer-implemented method for altering time data may include (i) identifying an untrusted executable that is capable of making queries to an operating system of the computing device, (ii) intercepting a request by the untrusted executable to query a system clock of the operating system of the computing device for a current time, (iii) calculating an offset value for the current time that is within a predetermined margin of the current time, and (iv) providing, in response to the request, the untrusted executable with the offset value for the current time instead of the current time. Various other methods, systems, and computer-readable media are also disclosed.

20 Claims, 7 Drawing Sheets

(56) References Cited

OTHER PUBLICATIONS

Crypto Noobs #2: Side Channel Attacks (http://www.cryptofails.com/post/70097430253/crypto-noobs-2-side-channel-attacks); Dec. 15, 2013.
New ASLR-busting JavaScript is about to make drive-by exploits much nastier (https://arstechnica.com/security/2017/02/new-aslr-busting-javascript-is-about-to-make-drive-by-exploits-much-nastier/); Feb. 14, 2017.
Kamble et al.; U.S. Appl. No. 15/047,130; Systems and Methods for Establishing a Reputation for Related Program Files; filed Feb. 18, 2016.

\* cited by examiner

SYSTEMS AND METHODS FOR ALTERING TIME DATA

BACKGROUND

Many important and sensitive transactions take place each day on computing systems and networks, and many computing systems host sensitive data. From financial transactions large and small to medical data, legal data, and even classified data, large quantities of sensitive information are sent through networks and stored to disks. One very common method of security for this data, both in motion and in storage, is encryption. Sensitive files and messages are converted into an obscured form that can only be read by a computing system with the corresponding decryption key. Unsurprisingly, malicious actors are constantly attempting to find new and better ways of breaking encryption in order to access sensitive data for a wide variety of malicious purposes.

One way of breaking encryption is known as a timing attack. A malicious script that can determine the amount of time it takes for an encryption algorithm to access address tables used to encrypt data may gain significant insight into the encryption key used and may therefore break the encryption far more easily. Malicious scripts can also leverage timing data to perform other malicious activities, such as locating the memory addresses of system functionality for later exploitation. Unfortunately, traditional systems for protecting computing systems do not typically protect against timing attacks. The instant disclosure, therefore, identifies and addresses a need for systems and methods for altering time data.

SUMMARY

As will be described in greater detail below, the instant disclosure describes various systems and methods for thwarting timing attacks by altering time data sent to potentially malicious executables.

In one example, a computer-implemented method for altering time data may include (i) identifying an untrusted executable that is capable of making queries to an operating system of the computing device, (ii) intercepting a request by the untrusted executable to query a system clock of the operating system of the computing device for the current time, (iii) calculating an offset value for the current time that is within a predetermined margin of the current time, and (iv) providing, in response to the request, the untrusted executable with the offset value for the current time instead of the current time.

In some examples, providing the untrusted executable with the offset value for the current time may include thwarting a potential timing attack attempted by the untrusted executable by providing the untrusted executable with the offset value for the current time instead of the current time. In some examples, thwarting the potential timing attack may include preventing the untrusted executable from leveraging accurate system clock information to determine an amount of time taken to execute an encryption operation by preventing the untrusted executable from obtaining the accurate system clock information.

In some embodiments, identifying the untrusted executable may include determining that a reputation rating for the untrusted executable provided by a reputation system falls below a predetermined threshold for trustworthiness. In some examples, identifying the untrusted executable may include determining that a reputation rating provided by a reputation system for an entity that hosts the untrusted executable falls below a predetermined threshold for trustworthiness. In some examples, intercepting the request by the untrusted executable to query the system clock of the operating system may include hooking an application programming interface (API) of the operating system in order to intercept requests to the system clock of the operating system.

In one embodiment, the computer-implemented method may further include (i) storing the offset value for the current time, (ii) intercepting, at a later time, an additional request by the untrusted executable to query the system clock of the operating system of the computing device for the later time, (iii) calculating, based at least in part on the stored offset value, a new offset value for the later time that is within a predetermined margin of the later time and that has an interval between the new offset value and the later time that is not equal to the previous interval that was used to calculate the stored offset value, and (iv) providing, in response to the additional request, the untrusted executable with the new offset value for the later time instead of the later time. In some examples, calculating the new offset value may include ensuring that the new offset value does not represent an earlier time than the stored offset value. In some examples, calculating the offset value for the current time may include calculating a partially randomized value to serve as an interval between the offset value and the current time.

In one embodiment, a system for implementing the above-described method may include (i) an identification module, stored in memory, that identifies an untrusted executable that is capable of making queries to an operating system of the computing device, (ii) an interception module, stored in memory, that intercepts a request by the untrusted executable to query a system clock of the operating system of the computing device for the current time, (iii) a calculation module, stored in memory, that calculates an offset value for the current time that is within a predetermined margin of the current time, (iv) a providing module, stored in memory, that provides, in response to the request, the untrusted executable with the offset value for the current time instead of the current time, and (v) at least one physical processor configured to execute the identification module, the interception module, the calculation module, and the providing module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) identify an untrusted executable that is capable of making queries to an operating system of the computing device, (ii) intercept a request by the untrusted executable to query a system clock of the operating system of the computing device for the current time, (iii) calculate an offset value for the current time that is within a predetermined margin of the current time, and (iv) provide, in response to the request, the untrusted executable with the offset value for the current time instead of the current time.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
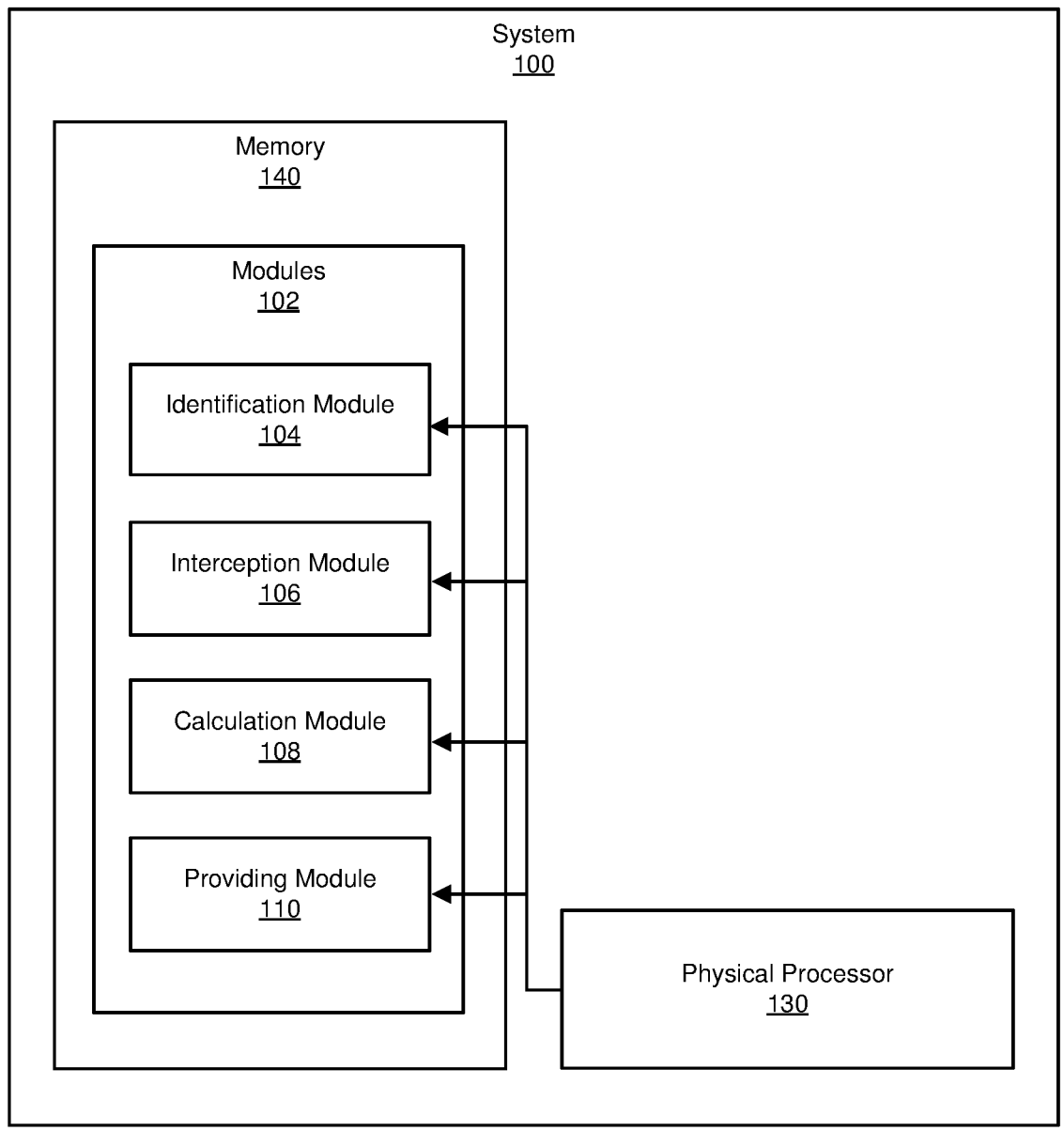
FIG. 1 is a block diagram of an example system for altering time data.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for altering time data. As will be explained in greater detail below, by sending time information slightly offset from the current time rather than sending an accurate representation of the current time, the systems and methods described herein may be able to prevent untrustworthy programs, scripts, and/or applications from accessing the precise system clock data that is necessary to perform timing attacks. Timing attacks may allow malicious applications to determine the amount of time an encryption algorithm takes to execute and leverage that information to decrypt data encrypted by the algorithm and/or determine the memory addresses of systems and/or application components for later exploitation. By sending very slightly inaccurate timing data, the systems and methods described herein may be able to protect computing systems from timing attacks without interfering with legitimate applications that use system clock data but don't require extreme precision. In addition, the systems and methods described herein may improve the functioning of a computing device by increasing the security of data encrypted by the computing device and/or components within the computing device. These systems and methods may also improve the field of encryption-based computer security by preventing malicious applications from decrypting encrypted data.

The following will provide, with reference to FIGS. 1, 2, 4, and 5, detailed descriptions of example systems for altering time data. Detailed descriptions of corresponding computer-implemented methods will also be provided in connection with FIG. 3. In addition, detailed descriptions of an example computing system and network architecture capable of implementing one or more of the embodiments described herein will be provided in connection with FIGS. 6 and 7, respectively.

FIG. 1 is a block diagram of example system 100 for altering time data. As illustrated in this figure, example system 100 may include one or more modules 102 for performing one or more tasks. For example, and as will be explained in greater detail below, example system 100 may include an identification module 104 that identifies an untrusted executable that is capable of making queries to an operating system of the computing device. Example system 100 may additionally include an interception module 106 that intercepts a request by the untrusted executable to query a system clock of the operating system of the computing device for the current time. Example system 100 may also include a calculation module 108 that calculates an offset value for the current time that is within a predetermined margin of the current time. Example system 100 may additionally include a providing module 110 that provides, in response to the request, the untrusted executable with the offset value for the current time instead of the current time. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate altering time data. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Figure 2:
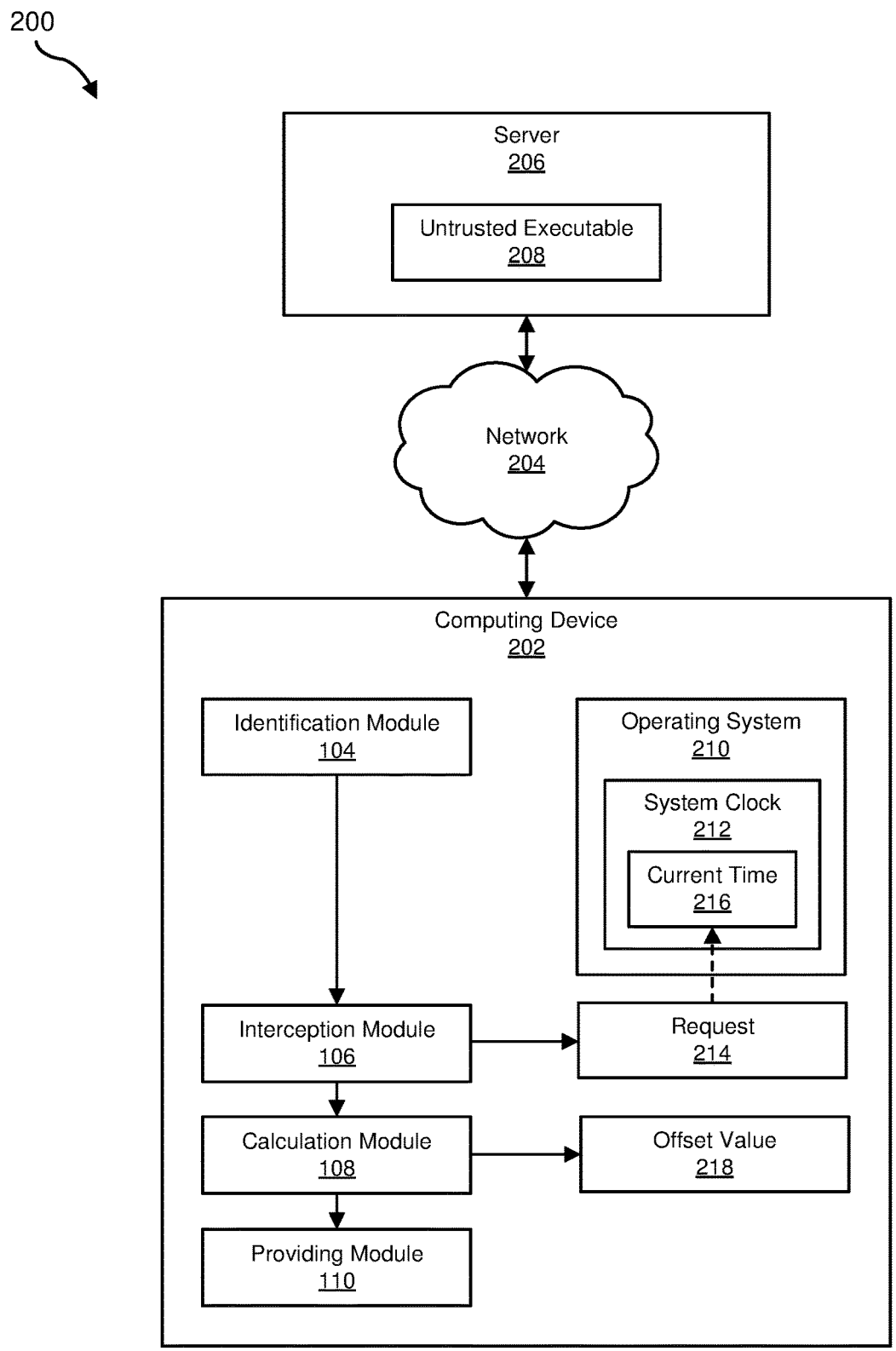
FIG. 2 is a block diagram of an additional example system for altering time data.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202 and/or any other suitable computing system. As will be described in greater detail below, one or more of modules 102 from FIG. 1 may, when executed by at least one processor of computing device 202, enable computing device 202 to thwart potential timing attacks by altering time data. For example, and as will be described in greater detail below, identification module 104 may identify an untrusted executable 208 that is capable of making queries to an operating system 210 of computing device 202 (e.g., via network 204 and/or via executing on computing device 202 after being downloaded from server 206). Either at some point after untrusted executable 208 is identified or as the trigger that causes untrusted executable 208 to be evaluated for trustworthiness, interception module 106 may intercept a request 214 by untrusted executable 208 to query a system clock 212 of operating system 210 of computing device 202 for current time 216. Next, calculation module 108 may calculate an offset value 218 for current time 216 that is within a predetermined margin of current time 216. Finally, providing module 110 may provide, in response to request 214, untrusted executable 208 with offset value 218 for current time 216 instead of current time 216.

Computing device 202 generally represents any type or form of computing device capable of reading computer-executable instructions. In some embodiments, computing device 202 may be a personal computer, such as a laptop or a desktop. In other embodiments, computing device 202 may be a server. Additional examples of computing device 202 include, without limitation, tablets, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Server 206 generally represents any type or form of computing device that is capable of hosting executables, such as a web server. Additional examples of server 206 include, without limitation, application servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Untrusted executable 208 generally represents any type or form of program, application, script, and/or code that is not trusted. Operating system 210 generally represents any type of software platform that provides basic computing functions. System clock 212 generally represents any device, programmable interval timer, counter, signal, script, application, library, and/or program that provides continuous information about the current time as perceived by the computing system that hosts system clock 212. Current time 216 generally represents any representation of the current moment in time, such as a time and date stamp, Unix epoch, and/or clock reading. Request 214 generally represents any communication sent from one application, script, and/or program to another. Offset value 218 generally represents any representation of a time created by modifying the current time by adding and/or subtracting an interval.

Figure 3:
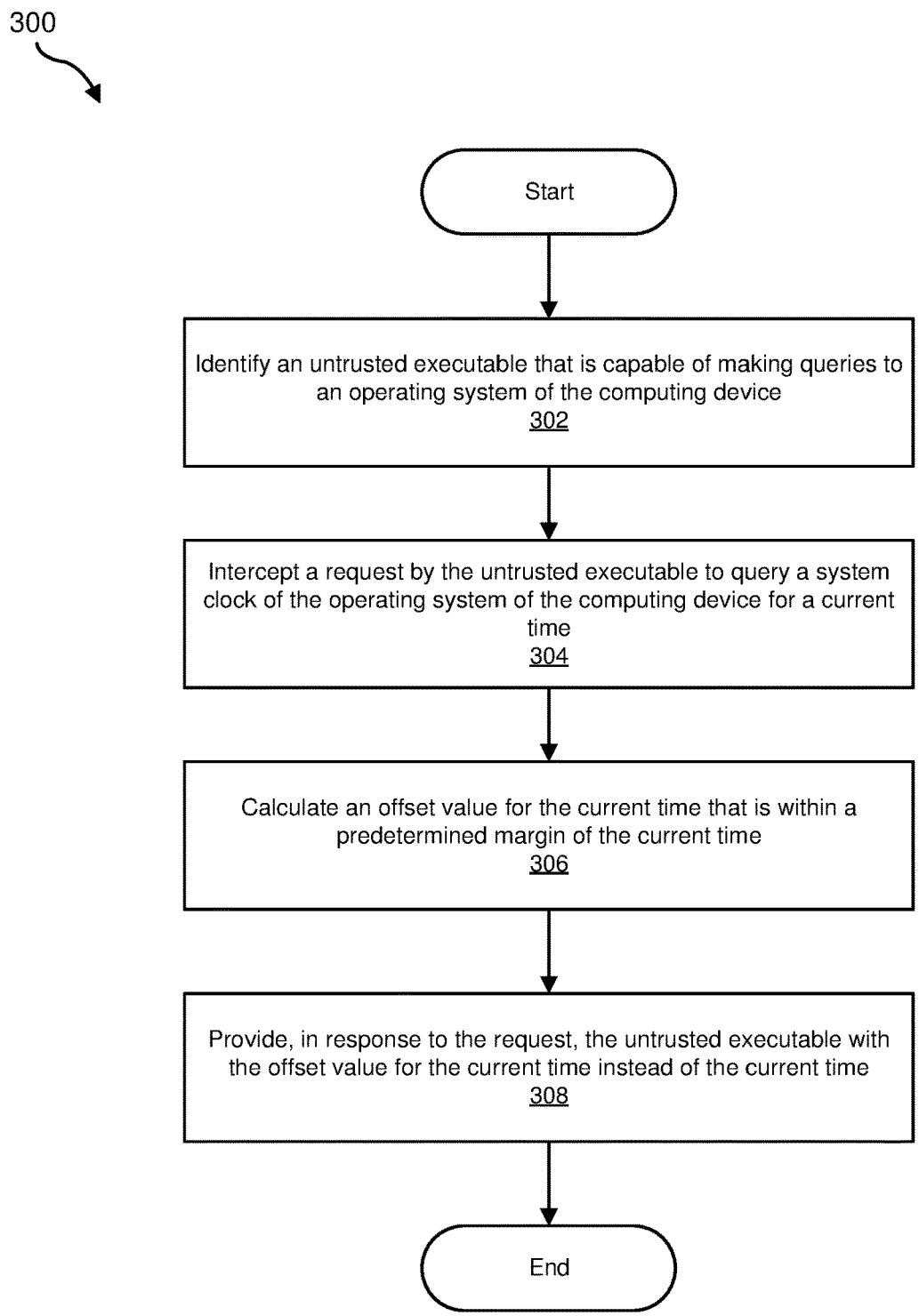
FIG. 3 is a flow diagram of an example method for altering time data.

FIG. 3 is a flow diagram of an example computer-implemented method 300 for altering time data. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may identify an untrusted executable that is capable of making queries to an operating system of the computing device. For example, identification module 104 may, as part of computing device 202 in FIG. 2, identify untrusted executable 208 that is capable of making queries to operating system 210 of computing device 202.

The term "executable," as used herein, generally refers to any application, program, library, code, script, and/or software that is capable of performing actions on a computing system. In some examples, an executable may be a stand-alone application, such as a mobile phone app or an .EXE file. In other examples, an executable may be hosted by another entity, such as a script that is hosted by a web server and/or a library that is called by an application.

The term "untrusted," as used herein, generally refers to any executable that is not trusted by an anti-malware system and/or operating system of a computing device. In some embodiments, any executable that is not on a white list of trusted executables may be untrusted. In other embodiments, only executables on a black list of untrusted executables may be untrusted. Additionally or alternatively, an untrusted executable may have a reputation rating and/or score below a predetermined threshold for trustworthiness. In some examples, an executable classified by a security system as partially trusted may be considered untrusted.

Identification module 104 may identify an untrusted executable in a variety of ways and/or contexts. For example, identification module 104 may evaluate every executable operating on and/or making requests of a computing system to determine whether that executable is untrusted. In another embodiment, identification module 104 may evaluate the trustworthiness of an executable in response to the executable making a request of the system clock. In some examples, identification module 104 may identify the untrusted executable in response to determining one or more processes that may be vulnerable to timing attacks are in execution on the computing device. For example, identification module 104 may identify the untrusted executable in response to determining that the untrusted executable is in execution while a process that accesses an encryption API is in execution.

In some embodiments, identification module 104 may identify the untrusted executable by determining that a reputation rating for the untrusted executable provided by a reputation system falls below a predetermined threshold for trustworthiness. The term "reputation rating" or "reputation score," as used herein, generally refers to any description of the reputation of an executable including numerical representations, categorical representations, and/or tags. In some examples, identification module 104 may determine that the executable is untrusted because the executable is classified as untrusted by the reputation system. In other examples, identification module 104 may determine that the executable is untrusted because a numerical reputation score (such as a percentage ranking of trustworthiness) falls below a threshold for trustworthiness. Additionally or alternatively, identification module 104 may determine that the executable is untrusted based on the reputation system not possessing a reputation rating for the executable. In some embodiments, an executable that has been categorized as partially trusted by a reputation system may be categorized as untrusted by identification module 104.

In some examples, identification module 104 may identify the untrusted executable by determining that a reputation rating provided by a reputation system for an entity that hosts the untrusted executable falls below a predetermined threshold for trustworthiness. For example, identification module 104 may determine that a server that hosts the executable has an untrustworthy reputation. In one example, identification module 104 may have no reputation information for a script but may determine that the script is untrusted because the script is hosted on a webserver with a poor reputation rating. In another example, the executable may include a library and identification module 104 may determine that an application that uses the library is untrusted. For example, a piece of malware may use a trusted library that includes functions for querying the system clock. In this example, identification module 104 may determine that requests from the library should be treated as untrusted in this context even if the library is otherwise trusted.

In other examples, identification module 104 may determine that while an entity that hosts the untrusted executable has a high reputation score, the untrusted executable does not. For example, a trusted web server may become infected with and subsequently host a malicious script. In some embodiments, identification module 104 may identify a reputation score for the executable and a reputation score of the host of the executable and may determine the trustworthiness of the executable based on the lower of the two scores.

In some embodiments, identification module 104 may not have access to reputation data for individual executables of a certain type, such as scripts. In some examples, identification module 104 may assume a default reputation score for all executables that do not have individual reputation scores. For example, identification module 104 may use the reputation of the host of the executable and/or may categorize the executable as untrusted.

Identification module 104 may receive data from a variety of different types of reputation systems. For example, identification module 104 may be part of an anti-malware system and may store reputation ratings for executables. In another example, identification module 104 may query an external reputation database. Additionally or alternatively, identification module 104 may query an anti-malware system that may query a reputation database.

At step 304, one or more of the systems described herein may intercept a request by the untrusted executable to query a system clock of the operating system of the computing device for the current time. For example, interception module 106 may, as part of computing device 202 in FIG. 2, intercept request 214 by untrusted executable 208 to query system clock 212 of operating system 210 of computing device 202 for current time 216.

The term "system clock," as used herein, generally refers to any method used by an operating system to keep track of and/or represent the passing of time. In some embodiments, a system clock may be a physical component that may synchronize hardware components of a computing system. In other embodiments, a virtual computing system may include a software representation of a system clock. In some embodiments, a system clock may be entirely internal to a computing system. In other embodiments, a system clock may synchronize itself to an external clock via a network. In some embodiments, a system clock may respond to queries for the current time and/or be accessible via an operating system API that derives the current time from the status of the system clock. In some examples, the system clock may provide sufficient precision and/or accuracy to facilitate timing attacks. For example, the term "system clock" may refer to a timer that provides time at a granularity of 20 milliseconds or less, at a granularity of 1 millisecond or less, and/or at a granularity of nanoseconds.

Interception module 106 may intercept the request in a variety of ways. In some examples, interception module 106 may intercept the request by the untrusted executable to query the system clock of the operating system by hooking an API of the operating system in order to intercept requests to the system clock of the operating system. In some embodiments, interception module 106 may hook the API by replacing a section of the API code with altered code. In other embodiments, interception module 106 may hook the API by monitoring for and redirecting calls to the API.

In some embodiments, interception module 106 may intercept all queries to the system clock and may only perform further actions on queries made by untrusted executables. For example, interception module 106 may intercept a request to the system clock, query identification module 104 to determine whether the request was made by an untrusted executable, and forward the request to calculation module 108 if the request was made by an untrusted executable and to the system clock API if the request was made by a trusted executable. In other embodiments, interception module 106 may intercept only queries made by untrusted executables. For example, interception module 106 may monitor calls made by untrusted executables to operating system APIs in order to intercept calls made to query the system clock.

At step 306, one or more of the systems described herein may calculate an offset value for the current time that is within a predetermined margin of the current time. For example, calculation module 108 may, as part of computing device 202 in FIG. 2, calculate offset value 218 for current time 216 that is within a predetermined margin of current time 216.

Calculation module 108 may calculate an offset value in a variety of different ways. For example, calculation module 108 may calculate the offset value for the current time by calculating a partially randomized value to be added to and/or subtracted from the current time to create the offset value. In this example, calculation module 108 may use a variety of different sources of randomness, such as a random number generation function and/or an external source of randomness. In some examples, calculation module 108 may use various predetermined margins, such as three milliseconds, five milliseconds, and/or ten milliseconds. In some embodiments, calculation module 108 may use a predetermined margin that measures in nanoseconds rather than milliseconds.

Figure 4:
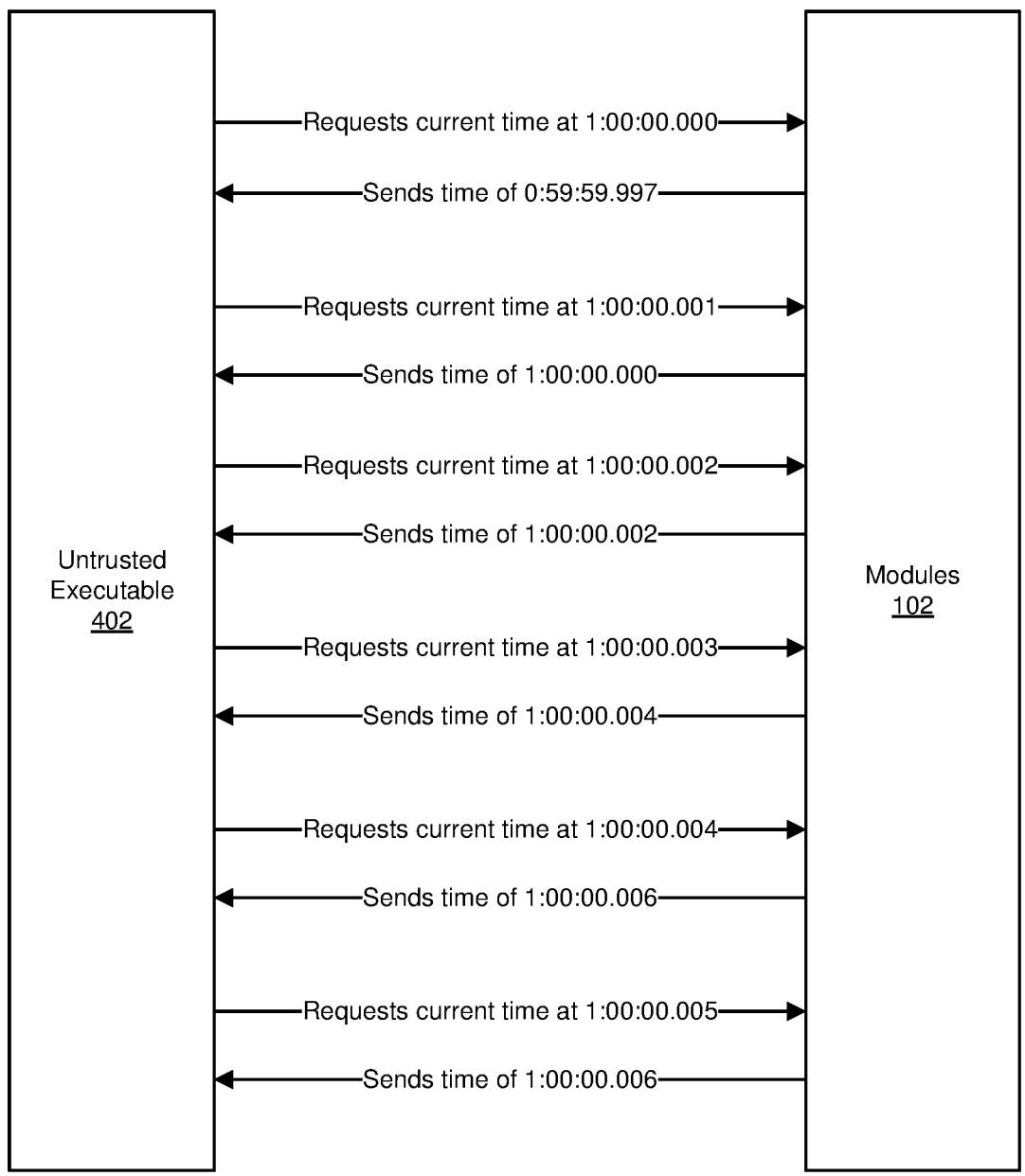
FIG. 4 is a block diagram of an example computing system for altering time data.

In some embodiments, calculation module 108 may store previously calculated intervals and/or offset values sent to the same untrusted executable in order to prevent the time sent to the executable from getting too far out of sync with the current time and/or in order to prevent the appearance that the system clock is moving backwards. The term "interval," as used herein, generally refers to the distance between the actual current time and the offset value for the current time. For example, as illustrated in FIG. 4, an untrusted executable 402 may send requests for the current time that are intercepted and responded to by modules 102. In this example, untrusted executable 402 may initially send a request for the current time at 1:00:00.000. Calculation module 108 may calculate an interval of −3 milliseconds and modules 102 may send back an offset time of 0:59:59.997. When untrusted executable sends the next request for the current time one millisecond later at 1:00:00.001, calculation module 108 may calculate an interval of −1 millisecond and modules 102 may send back a time of 1:00:00.000. In this example, untrusted executable 402 may continue making requests for the time every millisecond for the next four milliseconds and calculation module 108 may calculate intervals of +2 milliseconds, +1 millisecond, +2 milliseconds, and +1 millisecond, respectively. In some embodiments, calculation module 108 may never repeat the same interval twice in a row for the same untrusted application. For example, calculation module 108 may store each calculated interval and check the next calculated interval against the previous interval to ensure that the two intervals do not match. In some embodiments, calculation module 108 may check against a greater number of stored intervals, such as the past two, three, or four intervals, to ensure that an interval does not repeat too frequently. In some examples, calculation module 108 may send the same calculated time twice in a row to the same untrusted application, as illustrated in the last two exchanges in FIG. 4. In some embodiments, calculation module 108 may sometimes calculate an interval of 0 milliseconds.

Returning to FIG. 3, at step 308, one or more of the systems described herein may provide, in response to the request, the untrusted executable with the offset value for the current time instead of the current time. For example, providing module 110 may, as part of computing device 202 in FIG. 2, provide, in response to request 214, untrusted executable 208 with offset value 218 for current time 216 instead of current time 216.

Providing module 110 may provide the offset value to the untrusted executable in a variety of ways and contexts. For example, providing module 110 may provide the offset value to the untrusted executable as part of an API hook that redirects the request from the untrusted executable from the operating system API to providing module 110.

In some examples, the untrusted executable may make multiple requests for the current time. In these examples, the systems described herein may store the offset value for the current time, intercept, at a later time, an additional request by the untrusted executable for the time, calculate, based at least in part on the stored offset value, a new offset value for the later time that is within a predetermined margin of the later time and that has an interval between the new offset value and the later time that is not equal to the previous interval that was used to calculate the stored offset value, and provide, in response to the additional request, the untrusted executable with the new offset value for the later time instead of the later time.

In some examples, providing module 110 may provide the untrusted executable with the offset value for the current time in the context of thwarting a potential timing attack attempted by the untrusted executable. In some examples, the untrusted executable may send multiple requests to the system clock in order to determine the precise amount of time taken by an encryption function executing on the computing device. By determining the precise amount of time taken by the encryption function, especially after modifying a cache used to store data for the encryption function, the untrusted executable may derive useful information about the encryption function and/or encryption key that may allow the untrusted executable to break the encryption. In some examples, providing module 110 may prevent the potential timing attack by preventing the untrusted executable from leveraging accurate system clock information to determine the amount of time taken to execute an encryption operation by preventing the untrusted executable from obtaining accurate system clock information.

In other examples, providing module 110 may thwart a potential timing attack by preventing the untrusted executable from leveraging timing information to identify memory addresses of system and/or application components. In some examples, a malicious application may manipulate address tables and/or other data in a cache and observe the time it takes processes that rely on cached data to execute in order to determine which data in the cache the processes rely on. By providing the malicious application with offset data about the current time, providing module 110 may prevent the malicious application from accurately deducing information about applications and/or address tables.

For example, an untrusted executable may evict memory address tables from a cache, then time how long it takes a certain application to run to determine whether the application relies on the evicted memory address tables. In some examples, the untrusted executable may run multiple trials with different tables evicted. In one example, an application may run in 5 milliseconds if a required table is removed and 2 milliseconds if the required table is present in the cache. In this example, providing module 110 may provide the untrusted executable with system time data that indicates that 3 milliseconds elapsed while the application was executing in the first case and 4 milliseconds in the second, preventing the untrusted executable from correctly deducing that the application ran more slowly during the second trial and thus likely relied upon the missing address table.

By varying the system time sent to the untrusted executable by only miniscule amounts, providing module 110 may thwart potential timing attacks that rely on a highly level of precision and accuracy while allowing benign applications access to sufficiently accurate time information for most purposes. For example, a gaming application that relies on a timer to generate the user's score may measure time in seconds and may thus be unaffected by offsets of less than half a second.

Figure 5:
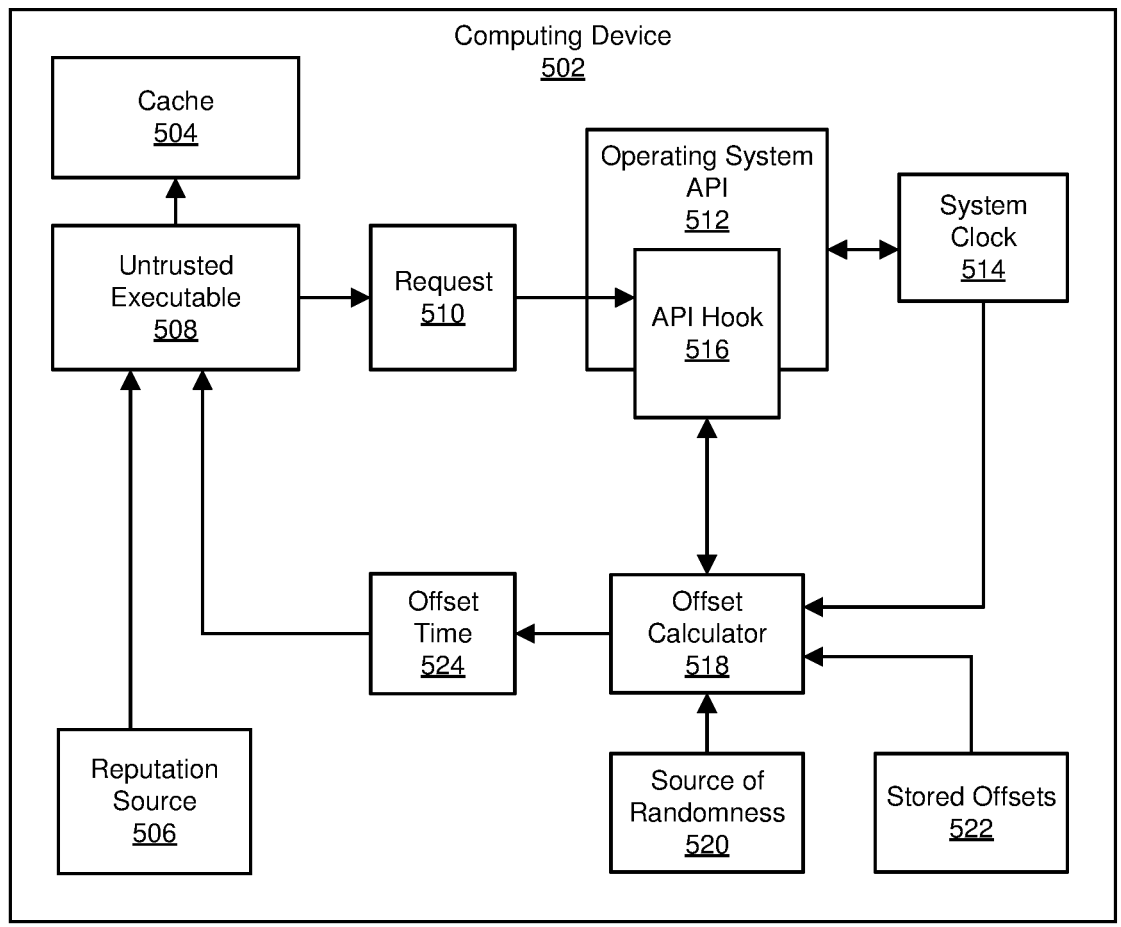
FIG. 5 is a block diagram of an example computing system for altering time data.

In some embodiments, the untrusted executable may be located on the computing system rather than on a server. For example, as illustrated in FIG. 5, an untrusted executable 508 may be hosted on a computing device 502 and may manipulate the data within a cache 504 in order to gather information about computing device 502 for subsequent attacks. In this example, a reputation source 506, such as an anti-malware system, may evaluate untrusted executable 508 and determine that untrusted executable 508 is not sufficiently trusted to receive accurate time information. Untrusted executable 508 may send a request 510 to a system clock 514 via an operating system API 512. An API hook 516 may intercept request 510 and prompt an offset calculator 518 to use a source of randomness 520, the current time from system clock 514, and/or information about previous offset times sent to untrusted executable 508 stored in stored offsets 522 to calculate an offset time 524 to be provided to untrusted executable 508. The systems described herein may follow the same process in response to any additional requests for the current time by untrusted executable 508, preventing untrusted executable 508 from deducing information about applications, encryption functions, and/or system components that rely on data from cache 504.

As described in connection with method 300 above, the systems and methods described herein may thwart potential timing attacks by providing untrusted executables with slightly offset timing data. By providing untrusted executables with slightly offset timing data, the systems and methods described herein may enable users to execute unknown applications with a greater degree of safety without preventing benign applications from having useful access to the system clock.

Figure 6:
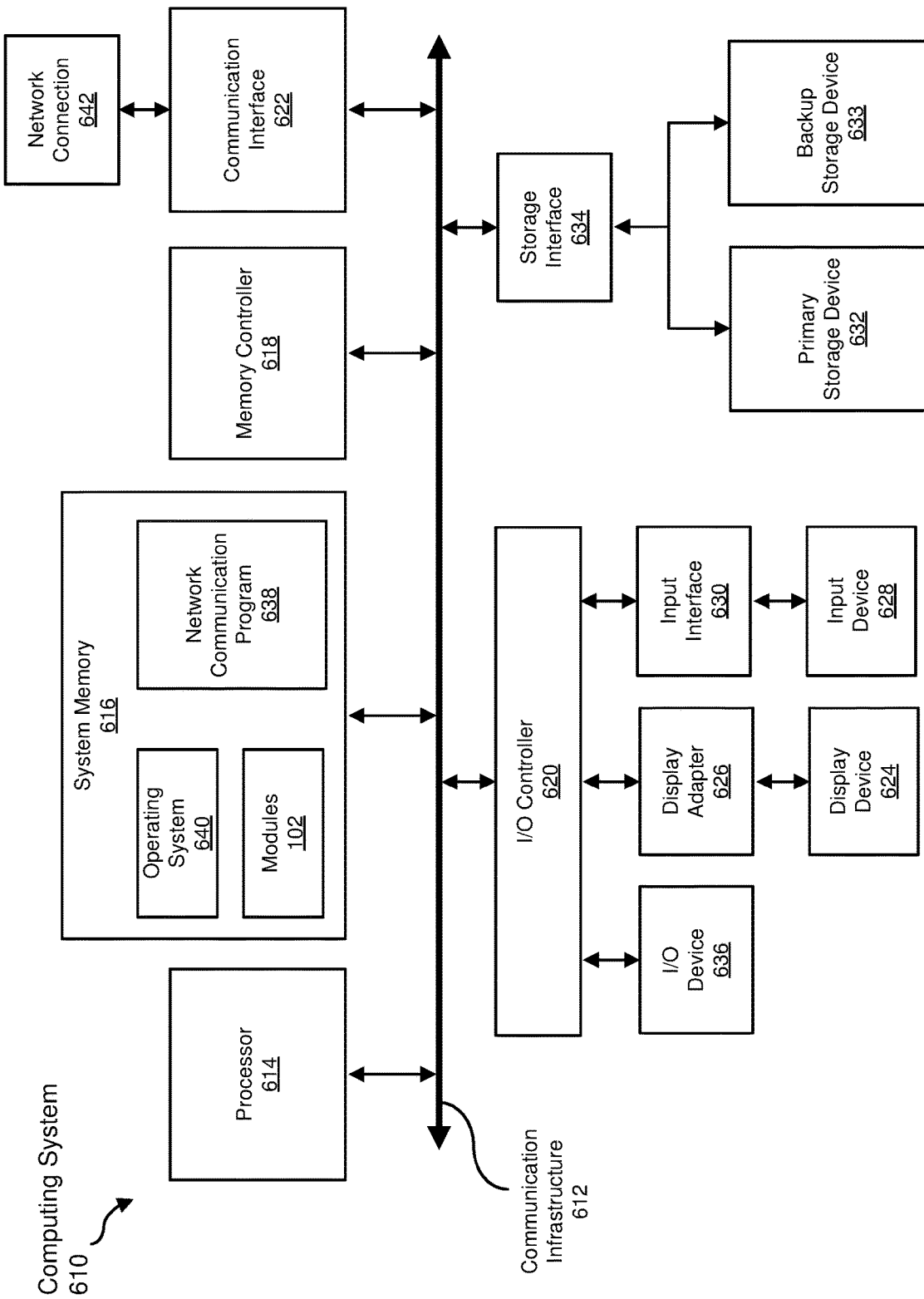
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636.

In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
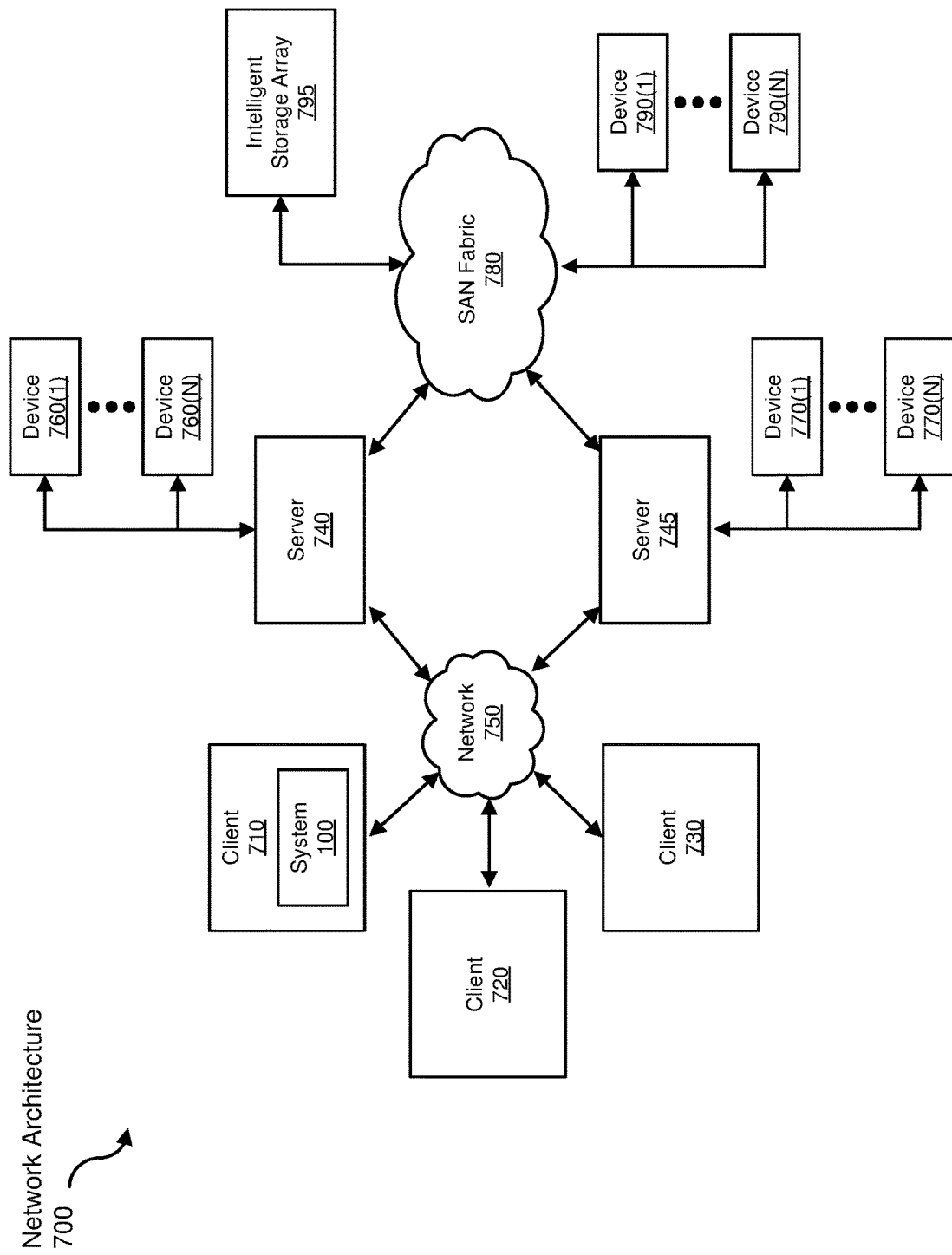
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for altering time data.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive system clock data to be transformed, transform the system clock data by modifying the representation of the current time, output a result of the transformation to an untrusted executable, use the result of the transformation to thwart a potential timing attack, and store the result of the transformation to an offset store for reference the next time an offset is calculated. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for altering time data, at least a portion of the method being performed by a computing device comprising at least one processor, the method comprising:

identifying an untrusted executable that is capable of making queries to an operating system of the computing device;

intercepting a request by the untrusted executable to query a system clock of the operating system of the computing device for a current time;

calculating an offset value for the current time that is within a predetermined margin of the current time;

providing, in response to the request, the untrusted executable with the offset value for the current time instead of the current time;

storing the offset value for the current time;

intercepting, at a later time, an additional request by the untrusted executable to query the system clock of the operating system of the computing device for the later time;

calculating, based at least in part on the stored offset value, a new offset value for the later time that is within a predetermined margin of the later time and that comprises an interval between the new offset value and the later time that is not equal to a previous interval that was used to calculate the stored offset value; and providing, in response to the additional request, the untrusted executable with the new offset value for the later time instead of the later time, thereby preventing the untrusted executable from obtaining accurate system clock information.

2. The computer-implemented method of claim 1, wherein providing the untrusted executable with the offset value for the current time comprises thwarting a potential timing attack attempted by the untrusted executable by providing the untrusted executable with the offset value for the current time instead of the current time.

3. The computer-implemented method of claim 2, wherein thwarting the potential timing attack comprises preventing the untrusted executable from leveraging accurate system clock information to determine an amount of time taken to execute an encryption operation by preventing the untrusted executable from obtaining the accurate system clock information.

4. The computer-implemented method of claim 1, wherein identifying the untrusted executable comprises determining that a reputation rating for the untrusted executable provided by a reputation system falls below a predetermined threshold for trustworthiness.

5. The computer-implemented method of claim 1, wherein identifying the untrusted executable comprises determining that a reputation rating provided by a reputation system for an entity that hosts the untrusted executable falls below a predetermined threshold for trustworthiness.

6. The computer-implemented method of claim 1, wherein intercepting the request by the untrusted executable to query the system clock of the operating system comprises hooking an application programming interface of the operating system in order to intercept requests to the system clock of the operating system.

7. The computer-implemented method of claim 1, wherein calculating the new offset value comprises ensuring that the new offset value does not represent an earlier time than the stored offset value.

8. The computer-implemented method of claim 1, wherein calculating the offset value for the current time comprises calculating a partially randomized value to serve as an interval between the offset value and the current time.

9. A system for altering time data, wherein:

the system comprises:

an identification module, stored in memory, that identifies an untrusted executable that is capable of making queries to an operating system of a computing device;

an interception module, stored in memory, that intercepts a request by the untrusted executable to query a system clock of the operating system of the computing device for a current time;

a calculation module, stored in memory, that calculates an offset value for the current time that is within a predetermined margin of the current time;

a providing module, stored in memory, that provides, in response to the request, the untrusted executable with the offset value for the current time instead of the current time; and at least one physical processor configured to execute the identification module, the interception module, the calculation module, and the providing module; and wherein:

the calculation module calculates the offset value for the current time by storing the offset value for the current time;

the interception module intercepts, at a later time, an additional request by the untrusted executable to query the system clock of the operating system of the computing device for the later time;

the calculation module calculates, based at least in part on the stored offset value, a new offset value for the later time that is within a predetermined margin of the later time and that comprises an interval between the new offset value and the later time that is not equal to a previous interval that was used to calculate the stored offset value; and the providing module provides, in response to the additional request, the untrusted executable with the new offset value for the later time instead of the later time, thereby preventing the untrusted executable from obtaining accurate system clock information.

10. The system of claim 9, wherein the providing module provides the untrusted executable with the offset value for the current time by thwarting a potential timing attack attempted by the untrusted executable by providing the untrusted executable with the offset value for the current time instead of the current time.

11. The system of claim 10, the providing module thwarts the potential timing attack by preventing the untrusted executable from leveraging accurate system clock information to determine an amount of time taken to execute an encryption operation by preventing the untrusted executable from obtaining the accurate system clock information.

12. The system of claim 9, wherein the identification module identifies the untrusted executable by determining that a reputation rating for the untrusted executable provided by a reputation system falls below a predetermined threshold for trustworthiness.

13. The system of claim 9, wherein the identification module identifies the untrusted executable by determining that a reputation rating provided by a reputation system for an entity that hosts the untrusted executable falls below a predetermined threshold for trustworthiness.

14. The system of claim 9, wherein the interception module intercepts the request by the untrusted executable to query the system clock of the operating system by hooking an application programming interface of the operating system in order to intercept requests to the system clock of the operating system.

15. The system of claim 9, wherein the calculation module calculates the new offset value by ensuring that the new offset value does not represent an earlier time than the stored offset value.

16. The system of claim 9, wherein the calculation module calculates the offset value for the current time by calculating a partially randomized value for the offset value.

17. A non-transitory computer-readable medium comprising one or more computer-readable instructions that, when executed by at least one processor of a computing device, cause the computing device to:
 identify an untrusted executable that is capable of making queries to an operating system of the computing device;
 intercept a request by the untrusted executable to query a system clock of the operating system of the computing device for a current time;
 calculate an offset value for the current time that is within a predetermined margin of the current time;
 provide, in response to the request, the untrusted executable with the offset value for the current time instead of the current time;
 store the offset value for the current time;
 intercept, at a later time, an additional request by the untrusted executable to query the system clock of the operating system of the computing device for the later time;
 calculate, based at least in part on the stored offset value, a new offset value for the later time that is within a predetermined margin of the later time and that comprises an interval between the new offset value and the later time that is not equal to a previous interval that was used to calculate the stored offset value; and
 provide, in response to the additional request, the untrusted executable with the new offset value for the later time instead of the later time, thereby preventing the untrusted executable from obtaining accurate system clock information.

18. The non-transitory computer-readable medium of claim 17, wherein the one or more computer-readable instructions cause the computing device to provide the untrusted executable with the offset value for the current time by thwarting a potential timing attack attempted by the untrusted executable by providing the untrusted executable with the offset value for the current time instead of the current time.

19. The non-transitory computer-readable medium of claim 18, wherein thwarting the potential timing attack comprises preventing the untrusted executable from leveraging accurate system clock information to determine an amount of time taken to execute an encryption operation by preventing the untrusted executable from obtaining the accurate system clock information.

20. The non-transitory computer-readable medium of claim 17, wherein identifying the untrusted executable comprises determining that a reputation rating for the untrusted executable provided by a reputation system falls below a predetermined threshold for trustworthiness.

* * * * *